United States Patent
Maeshima et al.

(10) Patent No.: US 7,247,177 B2
(45) Date of Patent: Jul. 24, 2007

(54) PRODUCTION METHOD FOR ELECTRIC DOUBLE-LAYER CAPACITOR

(75) Inventors: Hiroyuki Maeshima, Hyogo (JP); Kiyohiro Ishii, Osaka (JP); Hiroki Moriwake, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 311 days.

(21) Appl. No.: 10/534,492

(22) PCT Filed: Sep. 2, 2004

(86) PCT No.: PCT/JP2004/012735

§ 371 (c)(1),
(2), (4) Date: May 10, 2005

(87) PCT Pub. No.: WO2005/027159

PCT Pub. Date: Mar. 24, 2005

(65) Prior Publication Data

US 2006/0073668 A1   Apr. 6, 2006

(30) Foreign Application Priority Data

Sep. 11, 2003 (JP) .............................. 2003-319382

(51) Int. Cl.
*H01G 9/00* (2006.01)
(52) U.S. Cl. ............ 29/25.03; 438/239; 438/381; 438/622; 438/623; 257/E21.011; 257/E21.012; 257/E21.013
(58) Field of Classification Search ............ None
See application file for complete search history.

(56) References Cited

U.S. PATENT DOCUMENTS

| | | | | |
|---|---|---|---|---|
| 6,501,640 B1 * | 12/2002 | Niiori et al. | .............. | 361/504 |
| 2002/0048143 A1 * | 4/2002 | Lee et al. | .............. | 361/502 |
| 2004/0245120 A1 * | 12/2004 | Maeshima et al. | .............. | 205/775 |

FOREIGN PATENT DOCUMENTS

| | | |
|---|---|---|
| JP | 9-50944 | 2/1997 |
| JP | 9-223645 | 8/1997 |
| JP | 11-340101 | 12/1999 |
| JP | 11-354104 | 12/1999 |
| JP | 2000-150320 | 5/2000 |
| JP | 2001-15158 | 1/2001 |
| JP | 2004-71814 | 3/2004 |
| WO | WO 97/02252 | 1/1997 |

* cited by examiner

*Primary Examiner*—Michael Lebentritt
*Assistant Examiner*—Kyoung Lee
(74) *Attorney, Agent, or Firm*—McDermott Will & Emery LLP (57) ABSTRACT

A method of manufacturing electric double layer capacitors is disclosed. The method assumes a model in which solute is dissolved in solvent before preparing electrolyte, and estimates a withstanding voltage through a simulation. The electrolyte, of which withstanding voltage is expected to exceed a target value, is selectively prepared. The method adjusts respective surface areas of the positive electrode and the negative electrode of the capacitor for making full use of the withstanding voltage of the electrolyte. According to this method, a time for developing electrolyte can be substantially shortened, and an electric double layer capacitor having a high withstanding voltage can be efficiently developed.

12 Claims, 8 Drawing Sheets

PRODUCTION METHOD FOR ELECTRIC DOUBLE-LAYER CAPACITOR

TECHNICAL FIELD

The present invention relates to a method of manufacturing electric double layer capacitors used in a variety of electronic devices.

BACKGROUND ART

An electric double layer capacitor is expected to withstand a high voltage. A conventional method of preparing electrolyte synthetically is to produce electrolyte by combining numbers of conceivable solutes and solvents in order to obtain a higher withstanding voltage. The withstanding voltage of the electrolyte produced is measured to examine whether or not it meets the target withstanding voltage. Such a process of trial and error is repeated for preparing electrolyte, and then an amount of positive and negative electrodes is adjusted in order to make a full use of the withstanding voltage of the electrolyte thus prepared. Electric double layer capacitors have been thus manufactured.

The foregoing conventional method has a problem of taking an extremely long time to develop electrolyte. To be more specific, it needs the following three steps: (1) select appropriate solutes and solvents from among numbers of conceivable ones; (2) prepare electrolyte synthetically by dissolving the solutes into the solvents selected; and (3) measure a withstanding voltage of the electrolyte. Those steps are repeated again and again to obtain a target electrolyte. Therefore, it takes an extremely long time to complete the target electrolyte. As a result, the foregoing problem has caused delay in developing electric double layer capacitors.

DISCLOSURE OF THE INVENTION

The present invention provides a method of manufacturing electric double layer capacitors each of which includes electrolyte, a positive electrode and a negative electrode. The electrolyte is prepared synthetically through the steps of:

(1) assuming a model in which solutes are dissolved in solvents;

(2) forming an association complex by using cation and anion, both being elements of the solutes, and finding a first value by calculating a first energy which represents a total energy of the association complex in a stable state;

(3) finding a second value by calculating the total energies of radical species derived from one-electron reduction of the association complex, and a third value by calculating the total energies of radical species derived from one-electron reduction of the association complex;

(4) finding a fourth value by subtracting the second value from the first value, and finding a fifth value by subtracting the first value from the third value;

(5) finding a sixth value by subtracting the fourth value from the fifth value;

(6) selecting electrolyte having the sixth value higher than a target value; and further, (7) measuring a withstanding voltage of both the positive and the negative electrodes with a positive electrode and a negative electrode dipped in this electrolyte; and finally, (8) setting respective surface areas of the positive electrode and the negative electrodes such that the totaled amount of the withstanding voltages of the positive and the negative electrodes can be maximized and the sixth value of the electrolyte can be effectively used.

The manufacturing method of the present invention allows shortening a time necessary for developing the electrolyte, so that characteristics of a withstanding voltage can be fully used.

DETAILED DESCRIPTION OF PREFERRED EMBODIMENTS

The present invention provides a method of manufacturing electric double layer capacitors, and this method actually prepares synthetically only an electrolyte of which withstanding voltage is expected to exceed a target withstanding voltage through a simulation. This method thus eliminates a process of trial and error for developing electrolyte, thereby substantially shortening a time needed for developing the electrolyte. Adjustment of the surface areas of a positive and a negative electrodes allows exploiting a full potential of the withstanding voltage of the electrolyte developed, so that an electric double layer capacitor having a high withstanding voltage can be manufactured in a highly efficient manner.

In other words, the method of the present invention differs from the conventional method which selects conceivable solutes and solvents at random and dissolves the solutes into the solvents for producing electrolyte on trial and error basis. The method of the present invention uses a simulation, and comprises the steps of:

(1) Assume a model in which a solute is dissolved into solvent;

(2) Calculate a withstanding voltage of this model;

(3) Prepare electrolyte synthetically by dissolving the solute into the solvent only when the value calculated is higher than a target value;

(4) Dip a positive and a negative electrodes into the electrolyte synthetically prepared, and measure respective withstanding voltages of the positive and the negative electrodes; and (5) Total the respective withstanding voltages together and maximize the value totaled, and adjust respective surface areas of the positive and negative electrodes for making full use of the withstanding voltage of the electric double layer capacitance.

The manufacturing method of the present invention allows preparing synthetically an electrolyte which is supposed to have a withstanding voltage expected to exceed a target value in an extremely high probability comparing with the conventional method that combines solutes and solvents at random for synthetically preparing an electrolyte. Further, adjustment of respective surface areas of a positive and a negative electrodes allows making best use of the withstanding voltage of the electrolyte synthetically prepared. As a result, a time needed for developing an electric double layer capacitor having a high withstanding voltage can be substantially shortened.

Exemplary embodiments of the present invention are demonstrated hereinafter with reference to FIGS. 1-10.

EXEMPLARY EMBODIMENT 1

Figure 1:
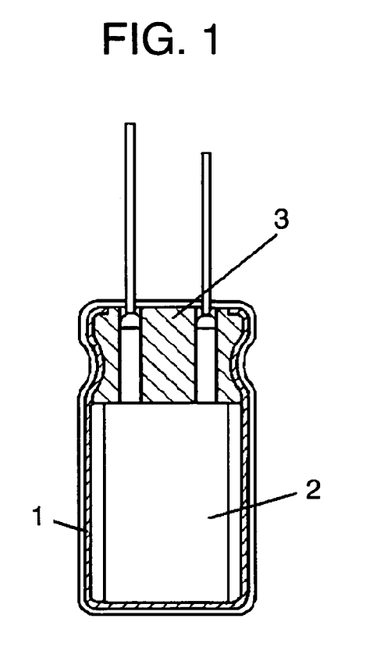
FIG. 1 shows a sectional view of an electric double layer capacitor in accordance with an exemplary embodiment of the present invention.
Figure 2:
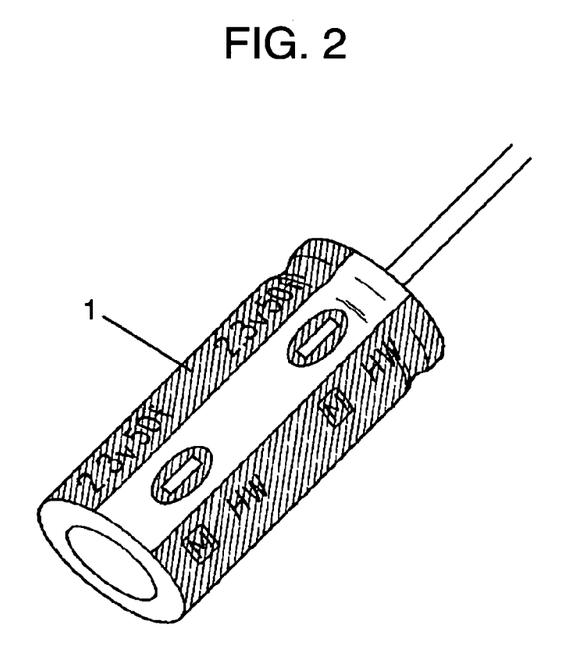
FIG. 2 shows a perspective view of the electric double layer capacitor in accordance with an exemplary embodiment of the present invention.
Figure 3:
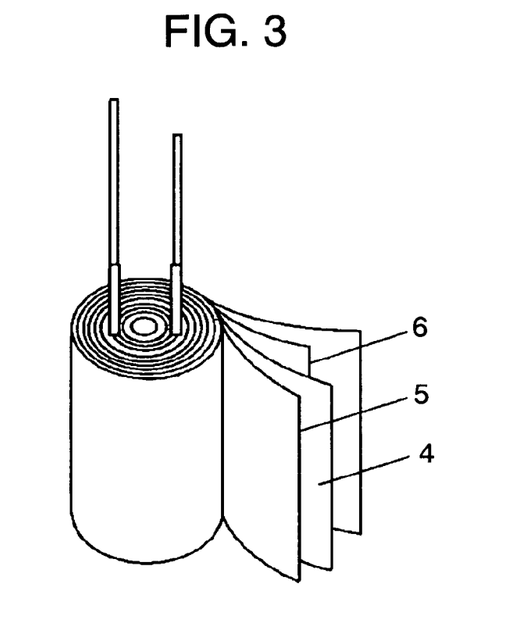
FIG. 3 shows a perspective view illustrating an essential part of the electric double layer capacitor in accordance with an exemplary embodiment of the present invention.
Figure 4:
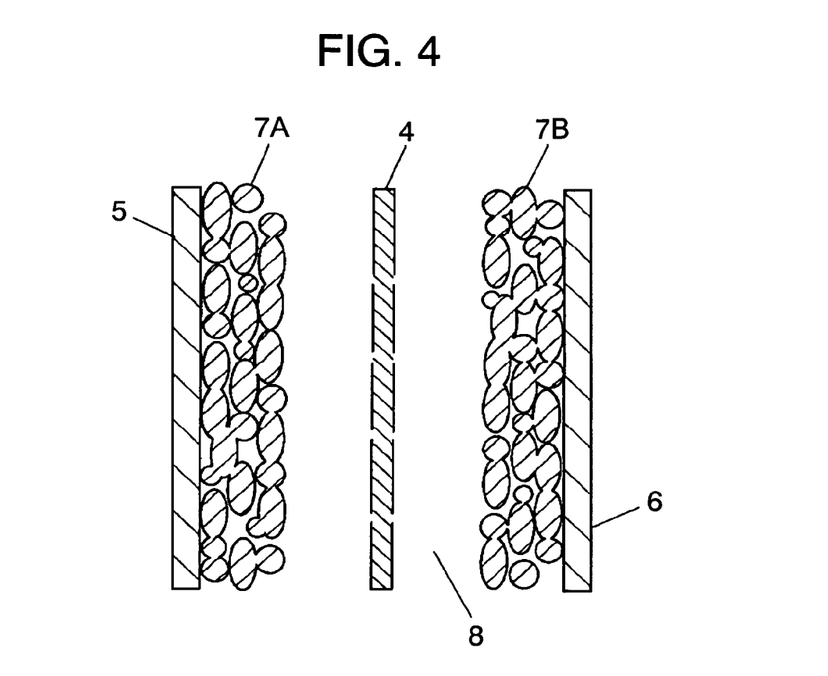
FIG. 4 shows an enlarged sectional view illustrating an essential part of the electric double layer capacitor in accordance with an exemplary embodiment of the present invention.

FIG. 1-FIG. 4 show an example of an electric double layer capacitor having a structure where element 2 is enclosed into outer container 1 with sealing rubber 3. As shown in FIG. 3 and FIG. 4, element 2 is formed by winding up belt-like separator paper 4 in a whirling pattern, where paper 4 having current collecting metals 5, 6 on its front and back respectively. Activated carbon 7A, 7B are disposed respectively on metals 5 and 6 at their sides confronting separator paper 4. Between metals 5 and 6, there is electrolyte 8 filled in outer container 1.

In this embodiment, electrolyte 8 is selected through a simulation before it is actually produced. The simulation employs a molecular orbital calculation, and uses a program code such as MOPAC93 (Fujitsu Co., Ltd.), GAUSSIAN98 (Gaussian Inc.). The procedure is demonstrated hereinafter with reference to FIG. 5 and onward.

Figure 5:
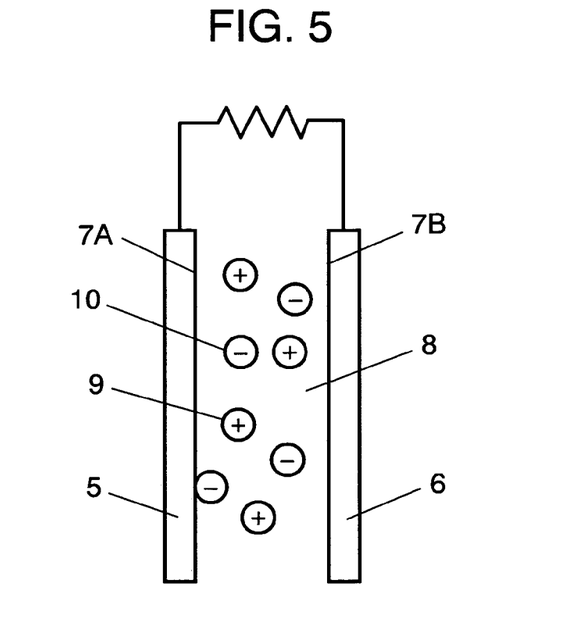
FIG. 5 shows a model of the essential part of the electric double layer capacitor in accordance with an exemplary embodiment of the present invention.

FIG. 5 shows a model of the electric double layer capacitor shown in FIG. 4, and it is expected that electrolyte 8 exists between current collecting metals 5 and 6. The state shown in FIG. 5 tells no voltage is applied between metals 5 and 6, so that cation 9 and anion 10 disperse in electrolyte 8.

Figure 6:
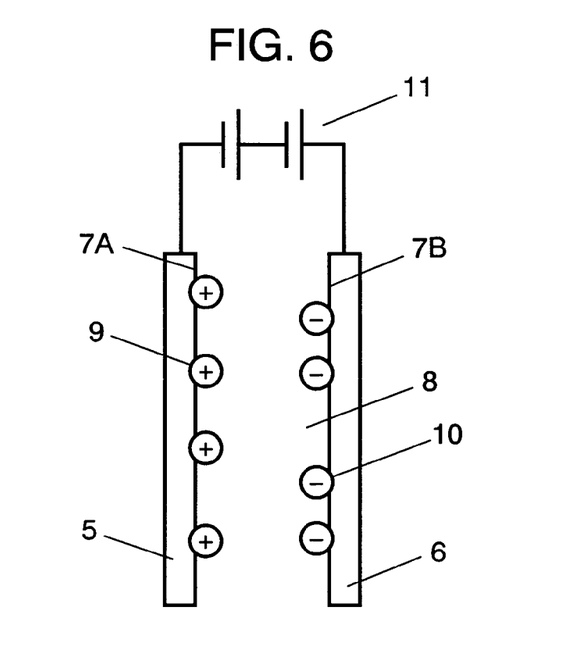
FIG. 6 shows a model of the essential part of the electric double layer capacitor in accordance with an exemplary embodiment of the present invention.

FIG. 6 shows a state where power supply 11 is coupled between metals 5 and 6. As shown in FIG. 6, a negative electrode of power supply 11 is coupled to current correcting metal 5, and a positive electrode of power supply 11 is coupled to metal 6. In this state, cation 9 is attracted onto the surface of activated carbon 7A by minus electric charges existing on the surface of activated carbon 7A disposed inside of metal 6. On the other hand, anion 10 is attracted onto the surface of activated carbon 7B by plus electric charges existing on the surface of activated carbon 7B disposed inside metal 6.

As discussed above, application of a voltage between current collecting metals 5 and 6 allows minus electric charges and plus electric charges to attract cation 9 and anion 10 respectively onto the surfaces of activated carbons 7A and 7B disposed respectively inside metals 5 and 6. As a result, energy is stored in this electric double-layer capacitor. Application of a potential difference greater than a certain value $V_E$ between cation 9 and the minus electric charges allows electrons to move from the surface of activated carbon 7A disposed inside metal 5 to electrolyte 8. Application of a potential difference greater than a certain value between anion 10 and the positive electron charges $V_O$ allows electrons to move from electrolyte 8 to the surface of activated carbon 7B disposed inside metal 6. The withstanding voltage of an electric double layer capacitor is equal to a size of potential window ($V_w$) which is calculated by adding $V_E$ and $V_O$.

The withstanding voltage of an electric double layer capacitor largely depends on electrolyte 8, therefore, it is necessary to study what kind of chemical species should be selected for obtaining a high withstanding voltage. In this first embodiment, electrolyte 8 is developed according to the procedure shown in FIG. 7.

Figure 7:
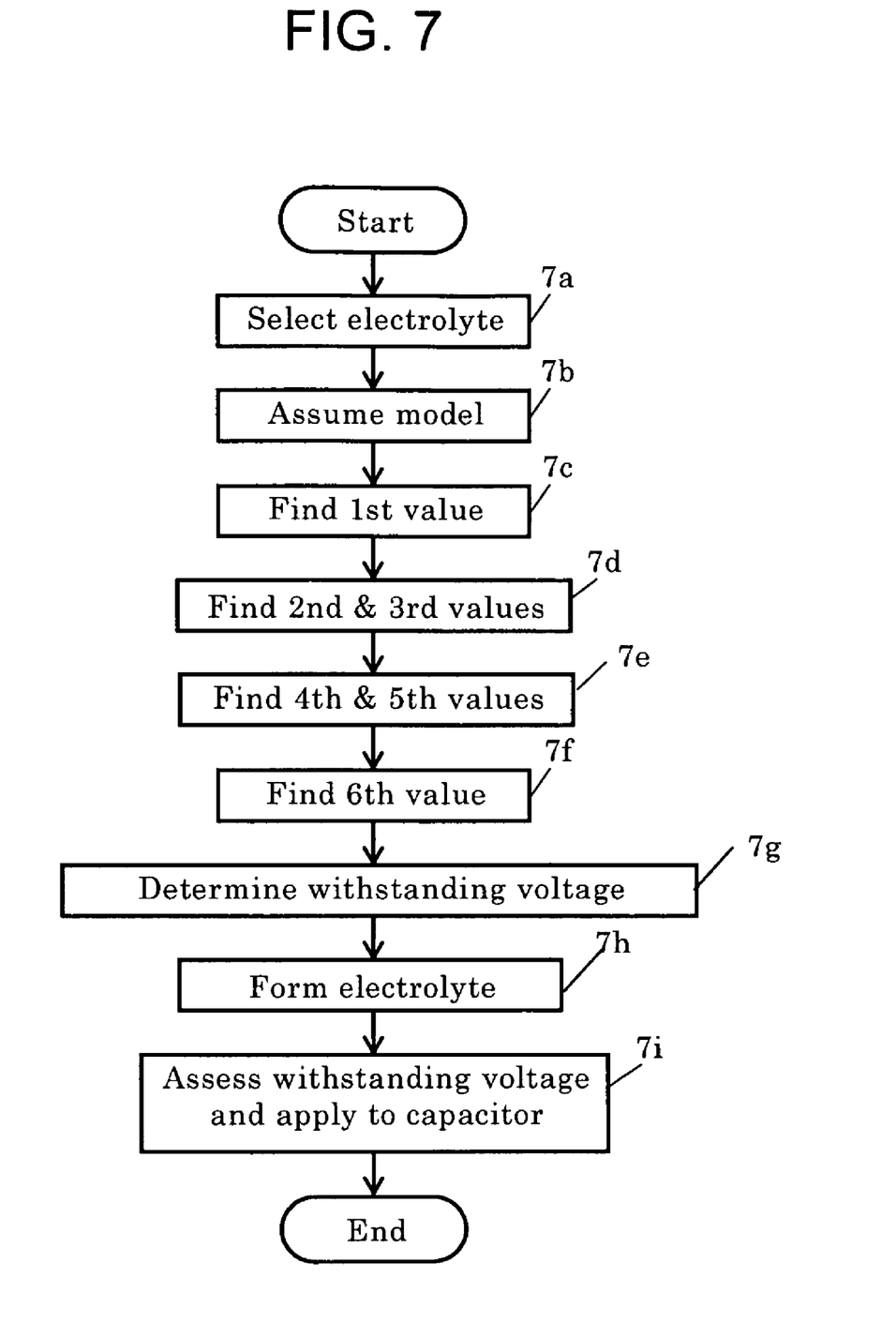
FIG. 7 shows a flowchart of manufacturing an electric double layer capacitor in accordance with an exemplary embodiment of the present invention.
Figure 8:
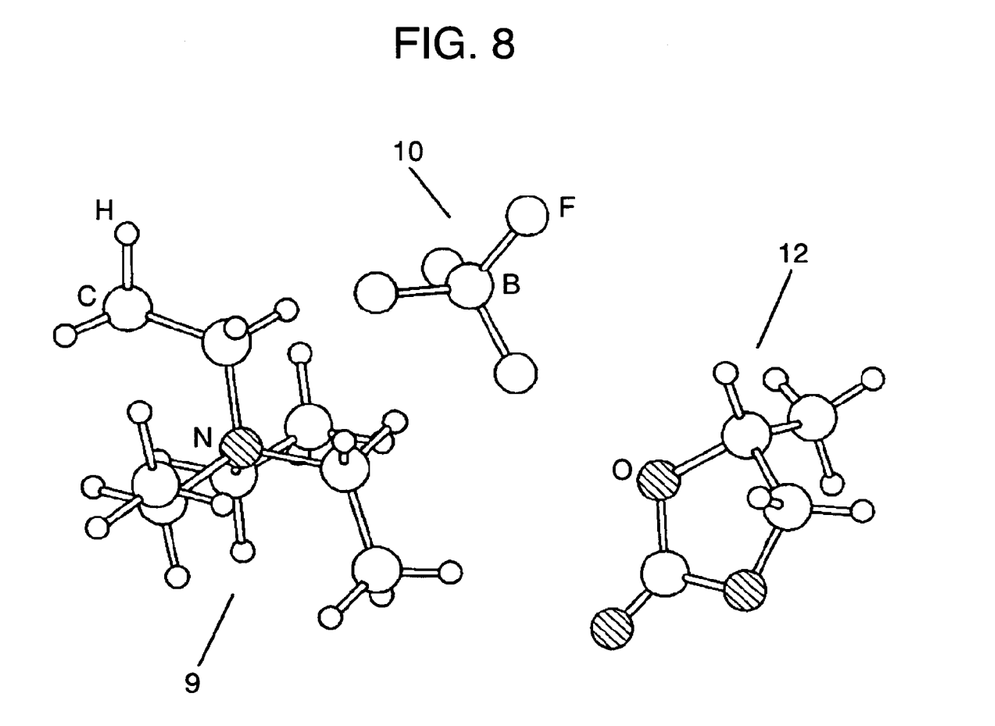
FIG. 8 shows a schematic diagram of electrolyte of an electric double layer capacitor in accordance with an exemplary embodiment of the present invention.
Figure 9:
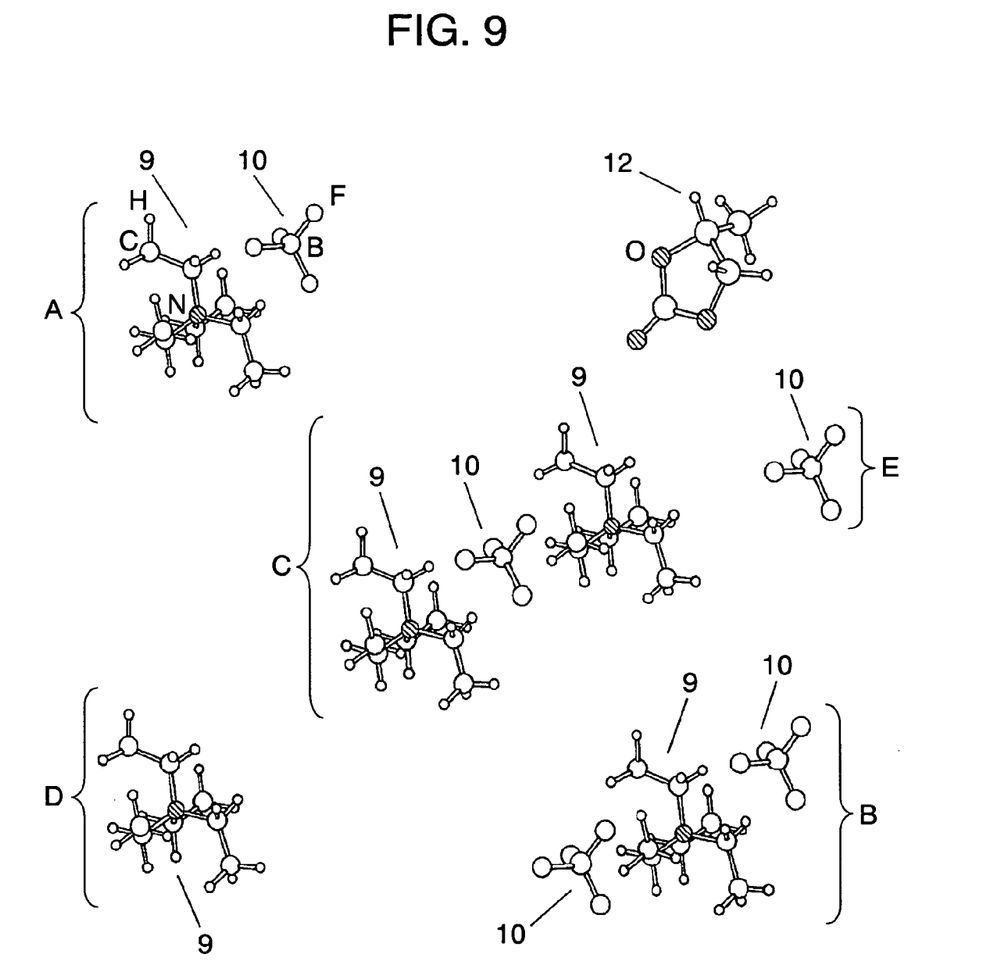
FIG. 9 shows a schematic diagram of electrolyte of an electric double layer capacitor in accordance with an exemplary embodiment of the present invention.

Step 7a is selecting an electrolyte, which is supposed to be formed of cation 9, anion 10 and solvent 12 as shown in FIG. 8. FIG. 8 shows an example of an electrolyte in which cation 9 is tetraethyl ammonium, anion 10 is tetrafluoroborate, and solvent 12 is propylenecarbonate. This is just an example and many other combinations are available.

Step 7b is assuming a model in which cation 9 and anion 10 are dissolved in solvent 12. In this first embodiment, a model in which cation 9 and anion 10 form an association complex is assumed, and this association complex is supposed to form a dimer made from one cation 9 and one anion 10. The model, in which this solute is dissolved in the solvent, can be assumed by storing the solute in a polarizable continuum which is an approximation of the solvent molecules; however, there are other methods to assume the model.

Step 7c is finding a first value by calculating a first energy of the association complex through a simulation, while the association complex formed of cation 9 and anion 10 is in a stable state.

Step 7d is finding a second and a third values respectively by calculating a second energy and a third energy produced respectively at reduction and oxidization of the association complex. When the association complex is reduced, electrons move from activated carbon 7A to the association complex existing near the surface of carbon 7A disposed inside current collecting metal 5 shown in FIG. 6. On the other hand, when the association complex is oxidized, electrons move from the association complex existing near the surface of activated carbon 7B to carbon 7B which is disposed inside current collecting metal 6. Reduction or oxidization of the association complex allows minus electric charges or plus electric charges stored respectively in metal 5 or metal 6 to move into electrolyte 8, so that energy stored in an electric double layer capacitor is lost. At this time cation 9 and anion 10, forming the association complex, become near to a radical state and tend to promote a chemical reaction, so that electrolyte 8 becomes vulnerable to breakup.

Step 7e is finding a fourth and a fifth values. The fourth value can be found by subtracting the second value from the first value. The fourth value means an energy gain produced at the reduction of the association complex on metal 5 side. On the other hand, the fifth value can be found by subtracting the first value from the third value, and the fifth value means an energy loss produced at the oxidization of the association complex on metal 6 side.

Step 7*f* is finding a sixth value by subtracting the fourth value from the fifth value, and the sixth value corresponds to a size of potential window $V_w$ estimated, namely, a withstanding voltage of the electric double layer capacitor.

Step 7*g* is determining the electrolyte to be appropriate for manufacturing an electric double layer capacitor having a high withstanding voltage. To be more specific, compare the sixth value calculated with a target value, and if the sixth value is higher than the target value, the electrolyte formed of selected cation 9, anion 10 and solvent 12 is determined to be appropriate for manufacturing the capacitor.

Step 7*h* is preparing the electrolyte synthetically by dissolving cation 9 and anion 10 into the solvent using chemical species specified in step 7*a* through step 7*g*.

Step 7*i* is using the electrolyte as an element of an electric double layer capacitor. To be more specific, measure a withstanding voltage of the electrolyte prepared to find whether or not a withstanding voltage estimated at the simulation can be obtained within an error range practically allowable. If the measurement satisfies the target value, use the electrolyte in the capacitor.

Then dip a positive and a negative electrodes made from activated carbon into the electrolyte thus prepared, thereby producing an electric double layer capacitor. When a voltage is applied between the electrodes, a control is needed for a voltage applied on the positive electrode not to exceed oxidizing voltage $V_O$, and for a voltage applied on the negative electrode not to exceed reducing voltage $V_R$. This control prevents oxidization or reduction of the electrolyte, and also suppresses deterioration of characteristics of the capacitor. Under this condition, in order to maximize the voltage applied between the electrodes, the respective surface areas of the positive and the negative electrodes are adjusted such that when the positive electrode has voltage $V_O$, a voltage of the negative electrode becomes $V_R$, and the voltage between the electrodes becomes $V_O+V_R$. A method of this adjustment is demonstrated hereinafter.

Figure 11:
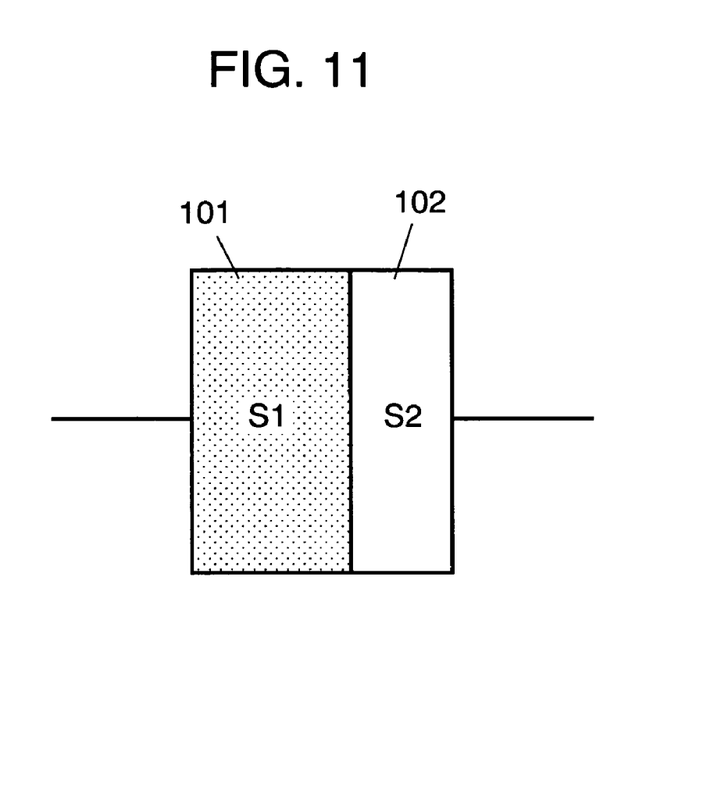
FIG. 11 shows a schematic diagram of a positive electrode and a negative electrode of an electric double layer capacitor.
Figure 12:
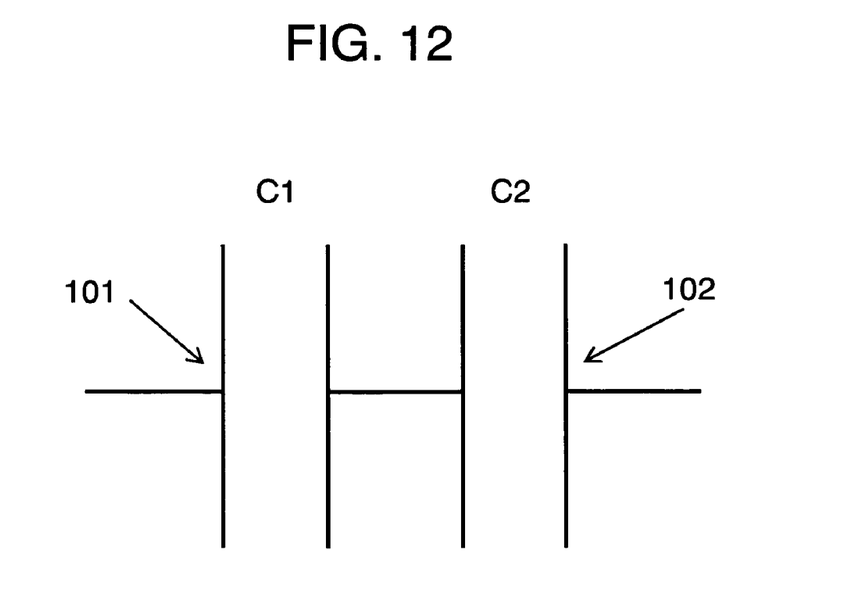
FIG. 12 shows a schematic diagram illustrating an electrostatic capacity of an electric double layer capacity.

Assume that electrodes employ activated carbon. Respective surface areas of the positive and the negative electrodes are proportionate to respective amounts of activated carbon. As shown in FIG. 11, negative electrode 101 has amount S1 of activated carbon, and positive electrode 102 has amount S2 of activated carbon. As shown in FIG. 12, negative electrode 101 has electrostatic capacity C1, and positive electrode 102 has electrostatic capacity C2. Those capacities are not only proportionate to the respective amounts of activated carbon, but also depend on kinds of electrolyte ions which store electric charges. Parameter $\alpha_1$ proper to cation and parameter $\alpha_2$ proper to anion are introduced, and assume that the following equations are established:

$$C_1 = \alpha_1 S_1, \quad C_2 = \alpha_2 S_2.$$

When a voltage is applied between the electrodes, negative electrode 101 is assumed to receive voltage $V_1$, and positive electrode 102 is assumed to receive voltage $V_2$, and both the electrodes are assumed to store electric charges Q respectively. Since $Q = C_1 V_1$ and $Q = C_2 V_2$ are established, $V_2/V_1 = C_1/C_2 = (\alpha_1 S_1)/(\alpha_2 S_2)$ is found.

In general, the following relation is found:

$$V_1 + V_2 \leq V_O + V_R$$

When $V_1 + V_2 = V_O + V_R$ is found, it can be said that the maximum voltage that can suppress the deterioration of characteristics of the electric double layer capacitor is applied. At this time, according to the relations of $V_1 = V_O$, $V_2 = V_R$, the "r" can be expressed in the following way:

$$r \equiv V_R/V_O = (\alpha_1 S_1)/(\alpha_2 S_2)$$

A total amount of the activated carbon of the positive and the negative electrodes stays a certain value, and assume that $S_O = S_1 + S_2$, $A = \alpha_1/\alpha_2$, then $S_1$ and $S_2$ can be expressed as follows:

$$S_1 = r/(A+r) S_O$$

$$S_2 = A/(A+r) S_O$$

Value A can be calculated by measuring a voltage between negative electrode 101 and positive electrode 102 when the respective surface areas of both the electrode, i.e. an amount of electrodes, are known.

The foregoing method can adjust the surface areas of both the electrodes so that the withstanding voltage of the electric double layer capacitor can be maximized. This capacitor is formed of an electrolyte and electrodes made from activated carbon. The surface area can be adjusted by changing one of a density, thickness, length or width of the electrode made from activated carbon, conductive assistant and binder, The surface area is varied according to kinds of activated carbon, i.e. kinds of carbon materials or activating methods. Those factors vary an available surface area per weight of activated carbon. Therefore, use of different kinds of activated carbons in a negative electrode and a positive electrode respectively allows adjusting surface areas of both of the electrodes. Mix two or more than two kinds of activated carbons, and change the kind and an amount of activated carbon, thereby adjusting the surface areas of the electrodes. Further, a variety of porous materials other than activated carbon can be used for forming electrodes, and the surface areas of the electrodes can be adjusted.

As discussed above, the present invention provides the method of manufacturing electric double layer capacitors, the method has an advantage of eliminating processes of trial and error in a step of developing electrolyte 8 over the prior art which needs to repeat the process of trial and error. To be more specific, select in advance an electrolyte expected to have a high withstanding voltage through a simulation, and actually prepare synthetically a few electrolytes selected. This method allows shortening a time needed for developing electrolyte 8. A model assumed, in which cation 9 and anion 10 are dissolved into solvent 12, allows estimating accurately a withstanding voltage of an electrolyte. Further, a step of adjusting surface areas of electrodes can maximize a withstanding voltage of the electrolyte, so that electric double layer capacitors having a high withstanding voltage can be manufactured efficiently.

EXEMPLARY EMBODIMENT 2

Figure 10:
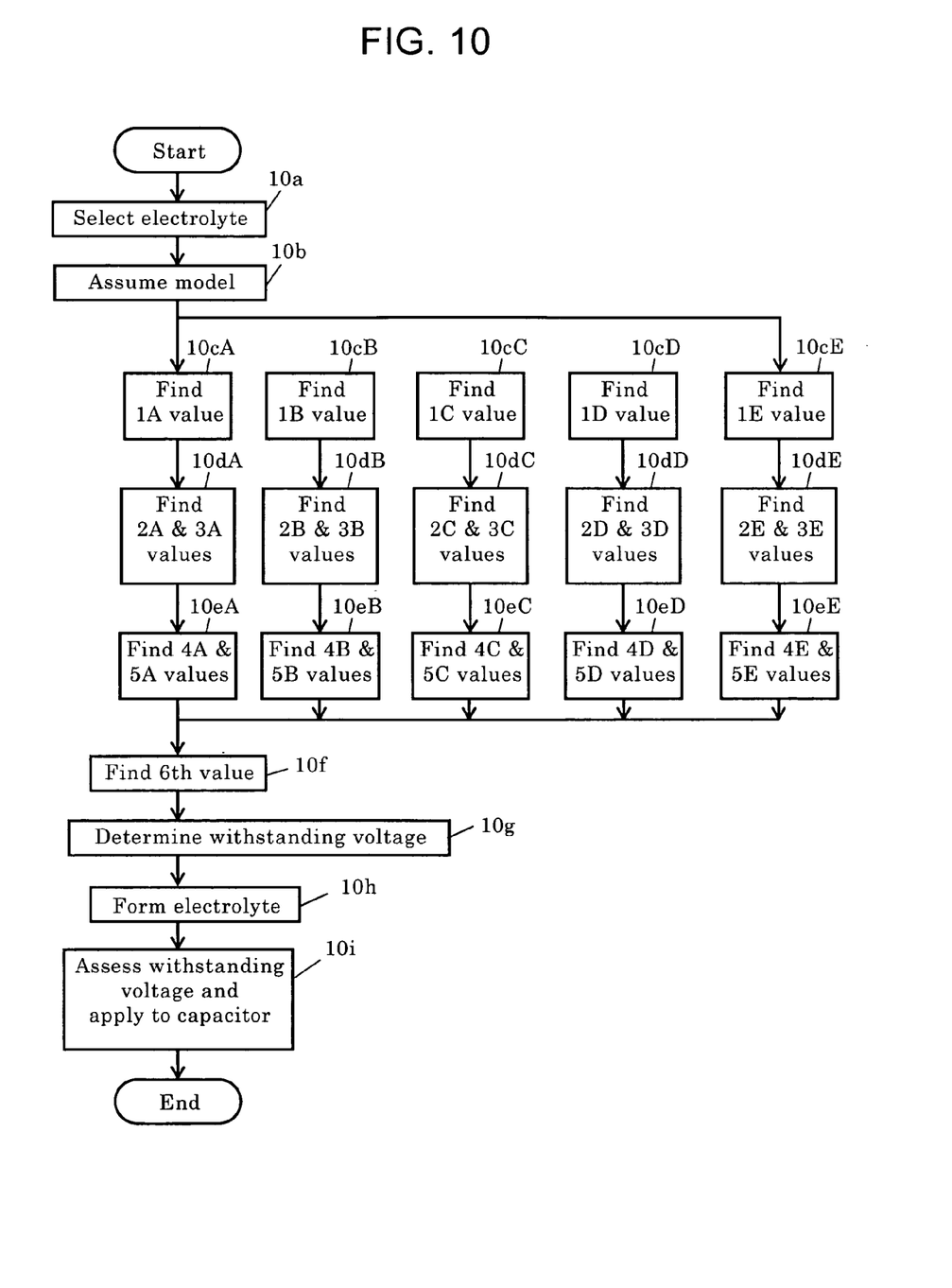
FIG. 10 shows a flowchart of manufacturing an electric double layer capacitor in accordance with an exemplary embodiment of the present invention.

Another embodiment of a method of manufacturing electric double layer capacitors is demonstrated hereinafter with reference to FIG. 10.

Step 10*a* is selecting an electrolyte, which is supposed to be formed of cation 9, anion 10 and solvent 12 as shown in FIG. 8. FIG. 8 shows an example of an electrolyte in which cation 9 is tetraethyl ammonium, anion 10 is tetrafluoroborate, and solvent 12 is propylenecarbonate. This is just an example and an electrolyte selected can have different elements from the foregoing ones.

Step 10*b* is assuming a model in which cation 9 and anion 10 are dissolved in solvent 12. In this second embodiment, assume that there are plural association complexes formed of cation 9 and anion 10. To be more specific, one cation 9 and one anion 10 form a dimer A, one cation 9 and two anions 10 form trimer B, and two cations 9 and one anion 10 form trimer C. In addition to those association complexes, assume there are cation D which is sole cation 9 that does not form an association complex, and anion E which is sole anion 10 that does not form an association complex. Other than the foregoing association complexes of dimer A, trimer B and trimer C, any association body possibly existing can be assumed. On the contrary, among dimer A, trimer B, trimer C, cation D and anion E, if there is one not possibly existing, that one can be excluded. The model, in which this solute is dissolved in the solvent, can be assumed by storing the solute in a polarizable continuum which is an approximation of the solvent; however, this model is not the only one but there are other models to be used.

Step 10cA is finding a first A (1A) value by calculating a first A energy of dimer A through a simulation, while dimer A is in a stable state.

Step 10dA is finding a second A (2A) and a third A (3A) values respectively by calculating a second A energy and a third A energy produced respectively at the reduction and the oxidization of dimer A. When dimer A is reduced, electrons move from activated carbon 7A to dimer A existing near the surface of carbon 7A disposed inside current collecting metal 5 shown in FIG. 6. On the other hand, when dimer A is oxidized, electrons move from dimer A existing near the surface of activated carbon 7B to carbon 7B which is disposed inside current collecting metal 6 shown in FIG. 6.

Step 10eA is finding a fourth A (4A) and a fifth A (5A) values. The fourth A value can be found by subtracting the second A value from the first A value. The fourth A value means an energy gain produced at the reduction of dimer A on metal 5 side. On the other hand, the fifth A value can be found by subtracting the first A value from the third A value, and the fifth A value means an energy loss produced at the oxidization of dimer A on metal 6 side.

Step 10cB is finding a first B (1B) value by calculating a first B energy of trimer B through a simulation, while trimer B is in a stable state.

Step 10dB is finding a second B and a third B values respectively by calculating a second B energy and a third B energy produced respectively at the reduction and the oxidization of trimer B. When trimer B is reduced, electrons move from activated carbon 7A to trimer B existing near the surface of carbon 7A disposed inside current collecting metal 5 shown in FIG. 6. On the other hand, when trimer B is oxidized, electrons move from trimer B existing near the surface of activated carbon 7B to carbon 7B which is disposed inside current collecting metal 6 shown in FIG. 6.

Step 10eB is finding a fourth B (4B) and a fifth B (5B) values. The fourth B value can be found by subtracting the second B value from the first B value. The fourth B value means an energy gain produced at the reduction of trimer B on metal 5 side. On the other hand, the fifth B value can be found by subtracting the first B value from the third B value, and the fifth B value means an energy loss produced at the oxidization of trimer B on metal 6 side.

Step 10cC is finding a first C (1C) value by calculating a first C energy of trimer C through a simulation, while trimer C is in a stable state.

Step 10dC is finding a second C (2C) and a third C (3C) values respectively by calculating a second C energy and a third C energy produced respectively at the reduction and the oxidization of trimer C. When trimer C is reduced, electrons move from activated carbon 7A to trimer C existing near the surface of carbon 7A disposed inside current collecting metal 5 shown in FIG. 6. On the other hand, when trimer C is oxidized, electrons move from trimer C existing near the surface of activated carbon 7B to carbon 7B which is disposed inside current collecting metal 6 shown in FIG. 6.

Step 10eC is finding a fourth C (4C) and a fifth C (5C) values. The fourth C value can be found by subtracting the second C value from the first C value. The fourth C value means an energy gain produced at the reduction of trimer C on metal 5 side. On the other hand, the fifth C value can be found by subtracting the first C value from the third C value, and the fifth C value means an energy loss produced at the oxidization of trimer C on metal 6 side.

Step 10cD is finding a first D (1D) value by calculating a first D energy of cation D through a simulation, while cation D is in a stable state.

Step 10dD is finding a second D (2D) and a third D (3D) values respectively by calculating a second D energy and a third D energy produced respectively at the reduction and the oxidization of cation D. When cation D is reduced, electrons move from activated carbon 7A to cation D existing near the surface of carbon 7A disposed inside current collecting metal 5 shown in FIG. 6. On the other hand, when cation D is oxidized, electrons move from cation D existing near the surface of activated carbon 7B to carbon 7B which is disposed inside current collecting metal 6 shown in FIG. 6.

Step 10eD is finding a fourth D (4D) and a fifth D (5D) values. The fourth D value can be found by subtracting the second D value from the first D value. The fourth D value means an energy gain produced at the reduction of cation D on metal 5 side. On the other hand, the fifth D value can be found by subtracting the first D value from the third D value, and the fifth D value means an energy loss produced at the oxidization of cation D on metal 6 side.

Step 10cE is finding a first E value by calculating a first E energy of anion E through a simulation, while anion E is in a stable state.

In step 10dE, find a second E (2E) and a third E (3E) values respectively by calculating a second E energy and a third E energy produced respectively at the reduction and the oxidization of anion E. When anion E is reduced, electrons move from activated carbon 7A to anion E existing near the surface of carbon 7A disposed inside current collecting metal 5 shown in FIG. 6. On the other hand, when anion E is oxidized, electrons move from anion E existing near the surface of activated carbon 7B to carbon 7B which is disposed inside current collecting metal 6 shown in FIG. 6.

Step 10eE is finding a fourth E (4E) and a fifth E (5E) values. The fourth E value can be found by subtracting the second E value from the first E value. The fourth E value means an energy gain produced at the reduction of anion E on metal 5 side. On the other hand, the fifth E value can be found by subtracting the first E value from the third E value, and the fifth E value means an energy loss produced at the oxidization of anion E on metal 6 side.

Step 10f is find a sixth value. Select the maximum value from among the values of fourth A, fourth B, fourth C, fourth D and fourth E, and name the maximum value the fourth value. Then select the minimum value from among the values of fifth A, fifth B, fifth C, fifth D and fifth E, and name the minimum value the fifth value. The six value is found by subtracting the fourth value from the fifth value, and this sixth value corresponds to an estimated size $V_w$ of a potential window, namely, a withstanding voltage of an electric double layer capacitor. In other words, it is assumed that various substances such as association complexes, sole cation and sole anion are mixed in an electrolyte, and among those substances, the one most easily reduced or oxidized can determine a withstanding voltage of the electrolyte.

In the foregoing procedure, if the energy gain produced at reduction of trimer C or cation D having plus electric charges is great enough, and the fourth C value or the fourth D value is small enough, it is not needed to find those small fourth C value or fourth D value. Those values can be neglected when the fourth value is determined in step 10f. If the energy loss produced at oxidization of trimer B or anion E having minus electric charges is great enough, and the fifth B value or the fifth E value can be great enough, it is not needed to find those great fifth B value or fifth E value. Those values can be neglected when the fifth value is determined in step 10f.

Step 10g is determining the electrolyte to be appropriate for manufacturing an electric double layer capacitor having a high withstanding voltage. To be more specific, compare the sixth value calculated with a target value, and if the sixth value is higher than the target value, the electrolyte formed of selected cation 9, anion 10 and solvent 12 is determined to be appropriate for manufacturing the capacitor.

Step 10h is preparing the electrolyte synthetically by dissolving cation 9 and anion 10 into the solvent using chemical species specified in step 10a through step 10g.

Step 10i is using the electrolyte as an element of an electric double layer capacitor. To be more specific, measure a withstanding voltage of the electrolyte prepared to find whether or not a withstanding voltage estimated at the simulation can be obtained within an error range practically allowable. If the measurement satisfies the target value, use the electrolyte in the capacitor.

Then dip a positive and a negative electrodes made from activated carbon into the electrolyte thus prepared, thereby producing an electric double layer capacitor. When a voltage is applied between the electrodes, a control is needed for a voltage applied to the positive electrode not to exceed oxidizing voltage $V_O$, and for a voltage applied to the negative electrode not to exceed reducing voltage $V_R$. This control prevents oxidization or reduction of the electrolyte, and also suppresses deterioration of characteristics of the capacitor. Under this condition, in order to maximize the voltage applied between the electrodes, the respective surface areas of the positive and the negative electrodes are adjusted such that when the positive electrode has voltage $V_O$, a voltage of the negative electrode becomes $V_R$, and the voltage between the electrodes becomes $V_O+V_R$. A method of this adjustment is demonstrated hereinafter.

Assume that electrodes employ activated carbon. Respective surface areas of the positive and the negative electrodes are proportionate to respective amounts of activated carbon. As shown in FIG. 11, the negative electrode has activated carbon amount S1, and the positive electrode has activated carbon amount S2. As shown in FIG. 12, the negative electrode has electrostatic capacity C1, and the positive electrode has electrostatic capacity C2. Those capacities are not only proportionate to the respective activated carbon amounts, but also depending on kinds of electrolyte ions which store electric charges. Parameter $\alpha_1$ proper to cation, and parameter $\alpha_2$ proper to anion are introduced, and assume that the following equations are established:

$$C_1=\alpha_1 S_1,\ C_2=\alpha_2 S_2.$$

When a voltage is applied between the electrodes, the negative electrode is assumed to 1 receive voltage $V_1$, and positive electrode 102 is assumed to receive voltage $V_2$, and both the electrodes are assumed to store electric charges Q respectively. Since $Q=C_1 V_1$ and $Q=C_2 V_2$ are established, $$V_2/V_1=C_1/C_2=(\alpha_1 S_1)/(\alpha_2 S_2) \text{ is found.}$$

In general, the following relation is found:

$$V_1+V_2 \leq V_O+V_R$$

When $V_1+V_2=V_O+V_R$ is found, it can be said that the maximum voltage that can suppress the deterioration of characteristics of the electric double layer capacitor is applied. At this time, according to the relations of:

$$V1=V_O,\ V2=VR,$$

the "r" can be expressed in the following way:

$$r \equiv V_R/V_O=(\alpha_1 S_1)/(\alpha_2 S_2)$$

A total amount of the activated carbon of the positive and the negative electrodes stays a certain value, and assume that $S_O=S_1+S_2$, $A=\alpha_1/\alpha_2$, then $S_1$ and $S_2$ can be expressed as follows:

$$S_1=r/(A+r)S_O$$

$$S_2=A/(A+r)S_O$$

Value A can be calculated by measuring a voltage applied between the negative electrode and the positive electrode when the respective surface areas of both the electrode, i.e. an amount of electrodes, are known.

The foregoing method can adjust the surface areas of both the electrodes so that the withstanding voltage of the electric double layer capacitor can be maximized. This capacitor is formed of an electrolyte and electrodes made from activated carbon. Since a method of adjusting the surface area is the same as described in the first embodiment, the description is omitted here.

As discussed above, the second embodiment of the present invention provides the method of manufacturing electric double layer capacitors, the method has an advantage of eliminating processes of trial and error in a step of developing electrolyte 8 over the prior art which needs to repeat the process of trial and error. To be more specific, select an electrolyte expected to have a high withstanding voltage through a simulation, and actually prepare synthetically only the electrolyte selected. This method allows shortening a time needed for developing electrolyte 8. A model assumed, in which cation 9 and anion 10 are dissolved into solvent 12, allows estimating accurately a withstanding voltage of an electrolyte. Further, a step of adjusting surface areas of electrodes can maximize a withstanding voltage of the electrolyte, so that electric double layer capacitors having a high withstanding voltage can be manufactured efficiently.

In the first and second embodiments, the first—the third energies used for calculating the first—the third values represent a total energy of the association complexes. The total energy includes kinetic energy of electrons, potential energy of the electrons and potential energy of atomic nucleus. Kinetic energy of atomic nucleus can be included therein. The fourth and the fifth values represent differences in the total energies.

INDUSTRIAL APPLICABILITY

The present invention provides a manufacturing method of electric double layer capacitor, and this method can shorten a period of developing an electrolyte necessary for the capacitor. The method also can maximize the characteristics of withstanding voltage of the electrolyte developed.

The invention claimed is:

1. A method of manufacturing an electric double layer capacitor having electrolyte, a positive electrode and a negative electrode, the method comprising:
   a first process for selecting the electrolyte through a simulation; and a second process for setting respective surface areas of the positive electrode and the negative electrode, wherein the first process includes the steps of:
- a first step for selecting cation, anion and solvent forming the electrolyte;
- a second step for finding a first value by calculating an energy which represents a total energy of the association complex formed of the cation and the anion while the association complex is in a stable state;
- a third step for finding a second value by calculating the total energy of a radical species derived from one-electron reduction of the association complex, and a third value by calculating the total energies of radical species derived from one-electron reduction of the association complex;
- a fourth step for finding a fourth value by subtracting the second value from the first value, and finding a fifth value by subtracting the first value from the third value;
- a fifth step for finding a sixth value by subtracting the fourth value from the fifth value; and
- a sixth step for determining whether or not the sixth value exceeds a given target value, wherein the second process sets the respective surface areas of the positive electrode and the negative electrode based on the sixth value of the electrolyte selected.

2. The manufacturing method of claim 1, wherein the association complex is a dimer formed of the cation and the anion.

3. The manufacturing method of claim 1, wherein the second step is finding the first value by calculating respective energies of the cation, the anion and the association complex individually while they are in a stable state, wherein the third step is finding the respective second and third values of the cation, the anion and the association complex individually, and wherein the fourth step is finding the respective fourth and fifth values of the cation, the anion and the association complex individually; and wherein the fifth step is finding the sixth value by subtracting a minimum value among the respective fourth values from a maximum value among the respective fifth values.

4. The manufacturing method of claim 3, wherein the association complex includes at least one selected from the group consisting of a dimer and a trimer both being formed of the cation and the anion.

5. The manufacturing method of claim 4, wherein the trimer is formed of one molecule of the cation and two molecules of the anion, or formed of two molecules of the cation and one molecule of the anion.

6. The manufacturing method of claim 1, wherein the positive electrode and the negative electrode are formed of one of coconut-shell based activated carbon or phenolic-resin based activated carbon.

7. The manufacturing method of claim 1, wherein the positive electrode and the negative electrode are formed of activated carbons of which at least ones of materials or activating methods are different from each other.

8. The manufacturing method of claim 1, wherein the second process sets respective surface areas of the positive electrode and the negative electrode such that the areas differ from each other.

9. The manufacturing method of claim 1, wherein the positive electrode and the negative electrode are formed of mixture made from two or more than two kinds of activated carbons, wherein the second process sets the surface areas by forming the positive electrode and the negative electrode by using mixtures formed of different kinds of activated carbons or mixtures formed at different compounding ratios.

10. The manufacturing method of claim 1, wherein at least one of the positive electrode and the negative electrode is formed of porous conductive material.

11. The manufacturing method of claim 1, wherein the electric double layer capacitor includes an electrode made from activated carbon, conduction adjuvant and binder, wherein the second process sets the respective surface areas of the positive electrode and the negative electrode by adjusting at least one value selected from the group consisting of a density, a length, a width and a thickness of the electrode.

12. A method of manufacturing an electric double layer capacitor including a positive electrode and a negative electrode formed of activated carbon, and electrolyte, the method comprising the steps of:

in a model in which a solute is dissolved in solvent, assuming that a plurality of different association complexes are formed of cation and anion both being elements of the solute, cation which does not form the association complex is formed, and anion which does not form the association complex is formed;

finding a plurality of first values by calculating respective energies which represents total energies of the association complexes, the cations or the anions individually while they are in a stable state;

finding a plurality of second values by calculating the total energies of radical species derived from one-electron reduction of the association complexes, the cation and the anion, and a plurality of third values by calculating the total energies of radical species derived from one-electron oxidization of the association complex, the cation and the anion;

finding a plurality of fourth values by subtracting the second value from the first value of the plurality of different association complexes, the cation and the anion individually, and finding a plurality of fifth values by subtracting the first value from the third value of the plurality of different association complexes, the cation and the anion individually;

selecting a maximum forth value from among the fourth values of the plurality of different association complexes, the cation and the anion individually, and selecting a minimum fifth value from among the fifth values of the plurality of different association complexes, the cation and the anion individually, and subtracting the maximum fourth value from the minimum fifth value for finding a sixth value;

selecting electrolyte having the sixth value higher than a target value;

measuring a withstanding voltage of a positive electrode and that of a negative electrode with the positive electrode and the negative electrode dipped in the electrolyte; and setting respective surface areas of the positive electrode and the negative electrode based on the sixth value such that a totaled value of respective withstanding voltages of the positive electrode and the negative electrode can be maximized.

* * * * *